No. 697,841. Patented Apr. 15, 1902.
H. J. HEIDER.
DRAFT EQUALIZER.
(Application filed Dec 30, 1901.)
(No Model.)
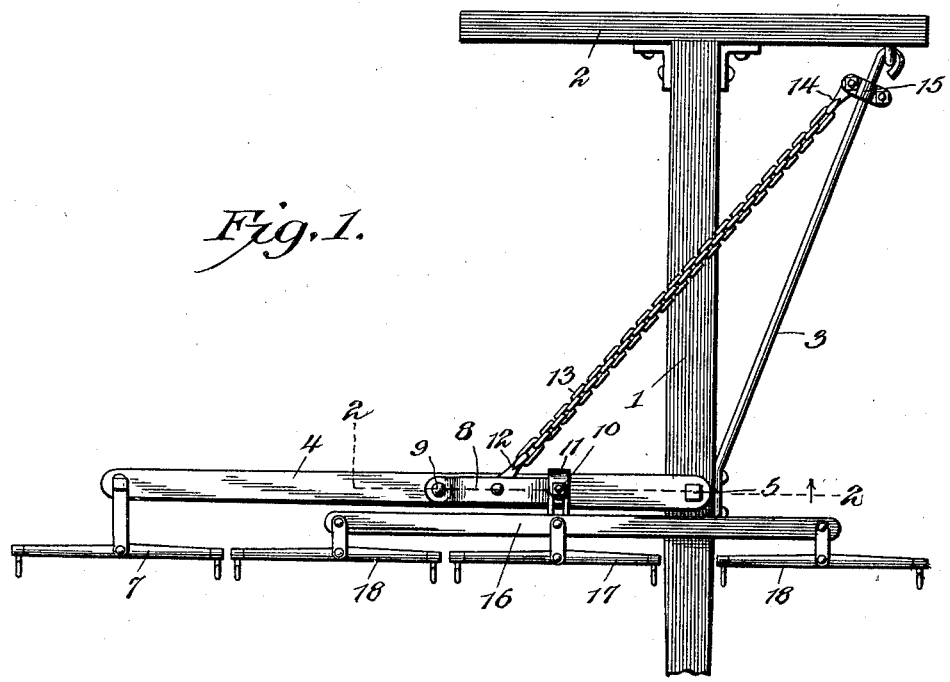
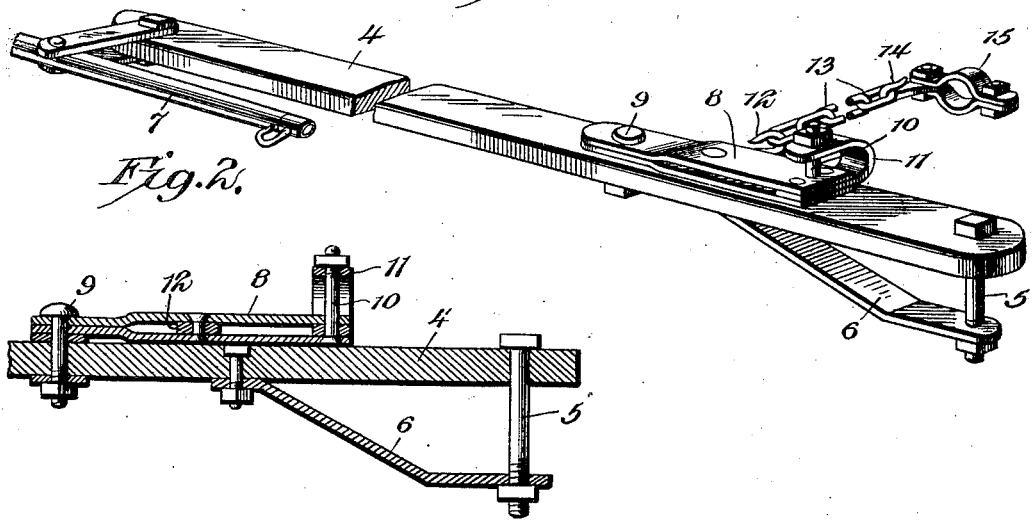
Henry J. Heider, Inventor,
Witnesses

UNITED STATES PATENT OFFICE.

HENRY J. HEIDER, OF TEMPLETON, IOWA.

DRAFT-EQUALIZER.

SPECIFICATION forming part of Letters Patent No. 697,841, dated April 15, 1902.

Application filed December 30, 1901. Serial No. 87,732. (No model.)

*To all whom it may concern:*

Be it known that I, HENRY J. HEIDER, a citizen of the United States, residing at Templeton, in the county of Carroll and State of Iowa, have invented a new and useful Draft-Equalizer, of which the following is a specification.

This invention relates to draft-equalizers, and is designed particularly for application to binders and similar agricultural machines.

It is furthermore designed to have the device in the form of an attachment which is complete in itself and capable of being conveniently applied to a draft tongue or pole without altering or changing the same in any manner whatsoever and, furthermore, arranged to accommodate four animals abreast.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a plan view showing the present invention in its applied position. Fig. 2 is an enlarged cross-sectional view on the line 2 2 of Fig. 1. Fig. 3 is a detail perspective view of the present device detached.

Like characters of reference designate corresponding parts in all the figures of the drawings.

Referring to the accompanying drawings, 1 designates an ordinary draft tongue or pole, which is connected to the front frame portion 2 of a binder in any ordinary manner and preferably provided with an inclined brace 3, extending between one side of the pole and the binder-frame. It will of course be understood that these parts are common and well known and have been shown to adequately illustrate the application and operation of the present improvements, and therefore may be varied in form without interfering with the spirit of the invention.

In carrying out the present invention there is provided an evener-bar 4, which normally lies substantially at right angles to the pole 1 and is pivotally connected thereto by means of a bolt 5 piercing the inner end of the evener-bar and the pole and also passing through a brace or bracket 6, carried by the under side of the bar. At the outer end of the bar there is provided a draft connection, preferably in the form of a whiffletree 7.

Between the middle of the evener-bar and its inner end and mounted upon the upper side thereof is a horizontally-swinging member 8, which is pivotally connected at its outer end to the draw-bar, as indicated at 9, and its inner free end is provided with a removable upstanding bolt 10, the upper end of which passes through a brace or clip 11, rising from the rear of the member and overhanging the upper end of the bolt. Extending rearwardly from the central portion of this member is a swinging hooked link 12, with which is detachably connected the forward end of a flexible connection 13, preferably in the form of a chain, the rear end of which is detachably connected to a hooked link 14, carried by a clamp or bracket 15, which is removably secured to the rear end of the brace 3, whereby the chain 13 is inclined transversely across the pole and forms a connection between the swinging member 8 and the frame of the binder. An ordinary draw-bar 16 is connected to the bolt 10 at the free end of the swinging member 8 and is provided with an intermediate whiffletree 17 and opposite terminal whiffletrees 18, the latter of which lie at opposite sides of the pole or tongue.

From the foregoing-described arrangement of parts it will be seen that three horses are disposed at one side of the pole and the other horse at the opposite side thereof, and the connections between the animals and the frame of the vehicle or machine are such as to equalize the draft thereon, and thereby move the same forwardly without any lateral strain. Moreover, it is apparent that the device of the present invention embodies, essentially, the evener-bar, the swinging member carried thereby, the draft connection at the outer free end of the evener-bar, and the brace or chain carried by the swinging member and designed for connection with the frame of the vehicle, and therefore it is apparent that these parts make up a complete device which is in the nature of an attachment that is arranged for connection with a pole without altering or changing any of the parts of the vehicle, as the draw-bar 16 is a common part of all vehicles and is merely changed from its usual position and connected to the free end of the swinging member 8.

What I claim is—

1. In a draft-equalizing apparatus, the combination with a support, of an evener-bar having its inner end pivoted thereto, a draft connection carried by the free end of the evener-bar, a swinging member pivoted to an intermediate portion of the evener-bar, a brace having its opposite ends secured respectively to the support and the swinging member, and a draw-bar connected intermediately to the free end of the swinging member and projected at opposite sides of the support.

2. In a draft-equalizing apparatus, the combination with a relatively fixed support, of an evener-bar having its inner end pivoted to the support and its outer end provided with a draft connection, a horizontally-swinging member having its outer end pivotally connected to the evener-bar at a point between the middle and the inner end thereof, a draw-bar connected to the free end of the swinging member and provided with terminal draft connections, and a flexible brace having one end pivotally connected to an intermediate portion of the swinging member and its opposite end connected to the fixed support.

3. The combination with a vehicle having a pole, and a brace extending between one side of the pole and the vehicle, of an evener-bar located at the opposite side of the pole and having its inner end pivotally connected thereto, a draft connection carried by the free end of the evener-bar, a horizontal swinging member having its outer end pivotally connected to the evener-bar, a draw-bar connected to the free end of the swinging member and provided with terminal draft connections, and a flexible brace having its forward end pivotally connected to an intermediate portion of the swinging member and its rear end pivotally connected to the brace.

4. A draft-equalizing device, comprising an evener-bar having its inner end provided with a pivotal or fulcrum connection for application to a support, a draft connection carried by the opposite free end of the bar, a horizontally-swinging member having its outer end pivotally connected to the evener-bar at a point between the middle and the inner end thereof, a draft connection carried by the free end of the swinging member, a pivotal hook carried by and projected rearwardly from the swinging member, a flexible-brace connection having one end provided with a detachable connection with the swinging hook, and an attaching bracket or clamp having a pivotal detachable connection with the other end of the flexible brace.

5. The combination with a vehicle-frame, and the draft-pole thereof, of an evener-bar pivotally connected to the pole, a draft connection carried by the outer end of the evener-bar, a swinging member pivotally carried by an intermediate portion of the evener-bar, a flexible brace having one end connected to the swinging member and its opposite rear end connected to the frame at the opposite side of the pole, whereby the brace inclines transversely across the latter, and a draft connection applied to the free end of the swinging member.

6. In a draft-equalizing apparatus, the combination with a pole, of an evener-bar having its inner end pivoted thereto, a draft connection carried by the free end of the evener-bar, a swinging member pivoted to an intermediate portion of the evener-bar and terminated short of the pole, a brace extending rearwardly from the swinging member and secured to the pole, and a draw-bar pivoted to the free end of the swinging member and projected at opposite sides of the pole.

7. In a draft-equalizing apparatus, the combination with a relatively fixed support, of an evener-bar having its inner end pivoted thereto, a draft connection carried by the free end of the evener-bar, a swinging member pivoted to an intermediate portion of the evener-bar, means fixed to and carried by the support to limit the forward movement of the swinging member, and a draw-bar pivoted to the free end of the swinging member.

In testimony that I claim the foregoing as my own I have hereto affixed my signature in the presence of two witnesses.

HENRY J. HEIDER.

Witnesses:
F. M. WILSON,
J. L. WALDMAN.